May 1, 1951 W. A. HARRISON 2,551,120
CAM OPERATED OSCILLATORY CULTIVATOR
Filed Aug. 20, 1946 4 Sheets-Sheet 2
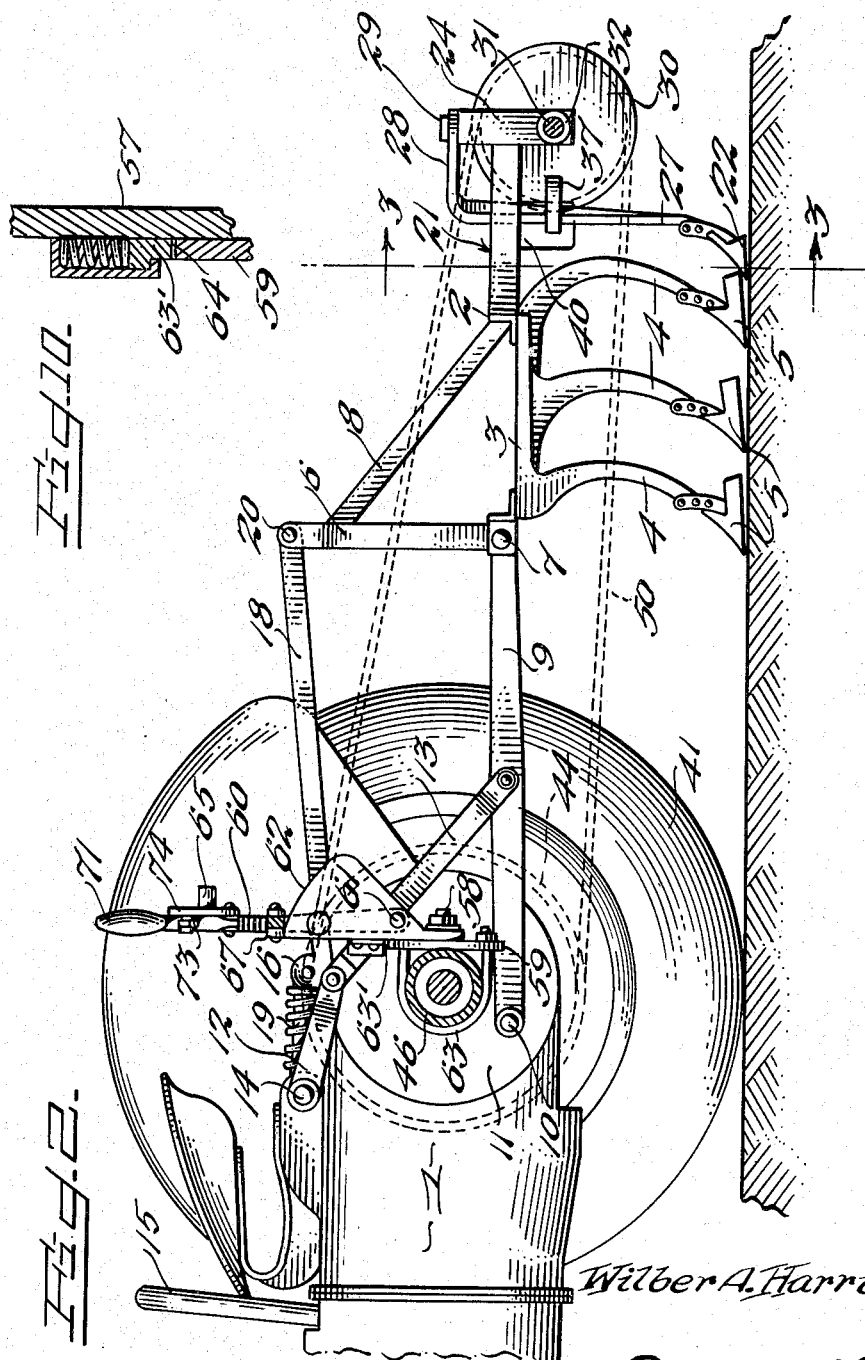
Inventor
Wilber A. Harrison.
By Clarence A. O'Brien
and Harvey B. Jacobson
Attorneys

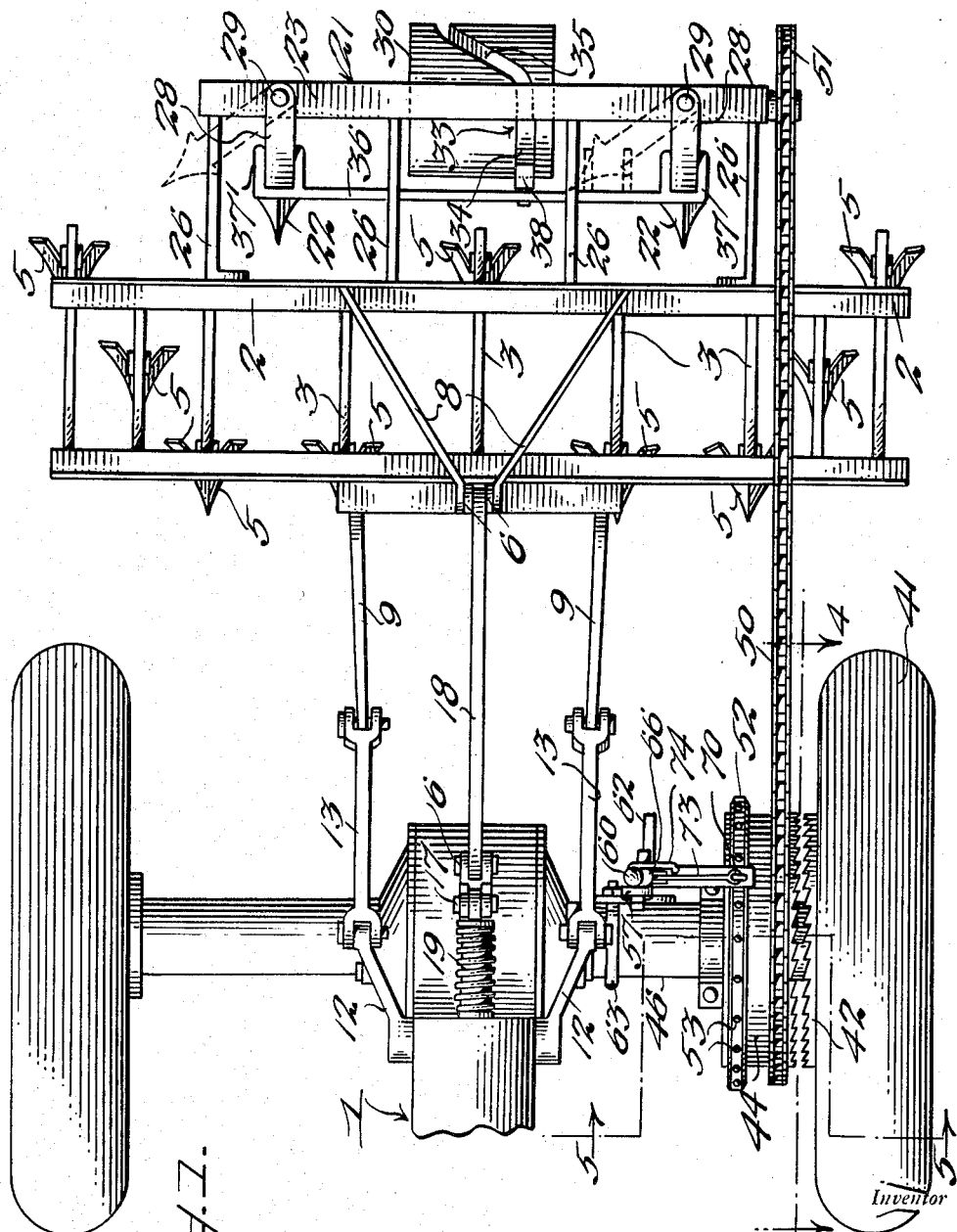

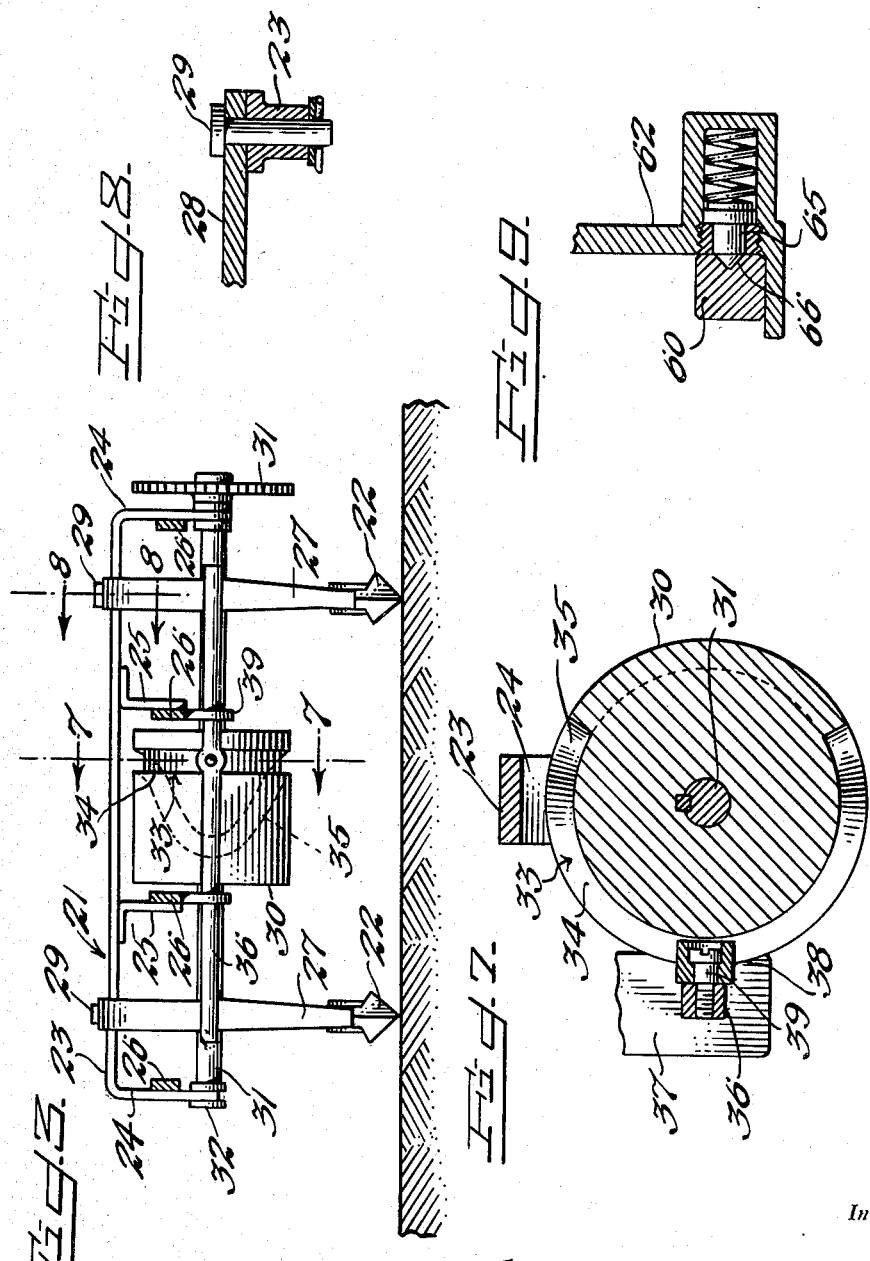

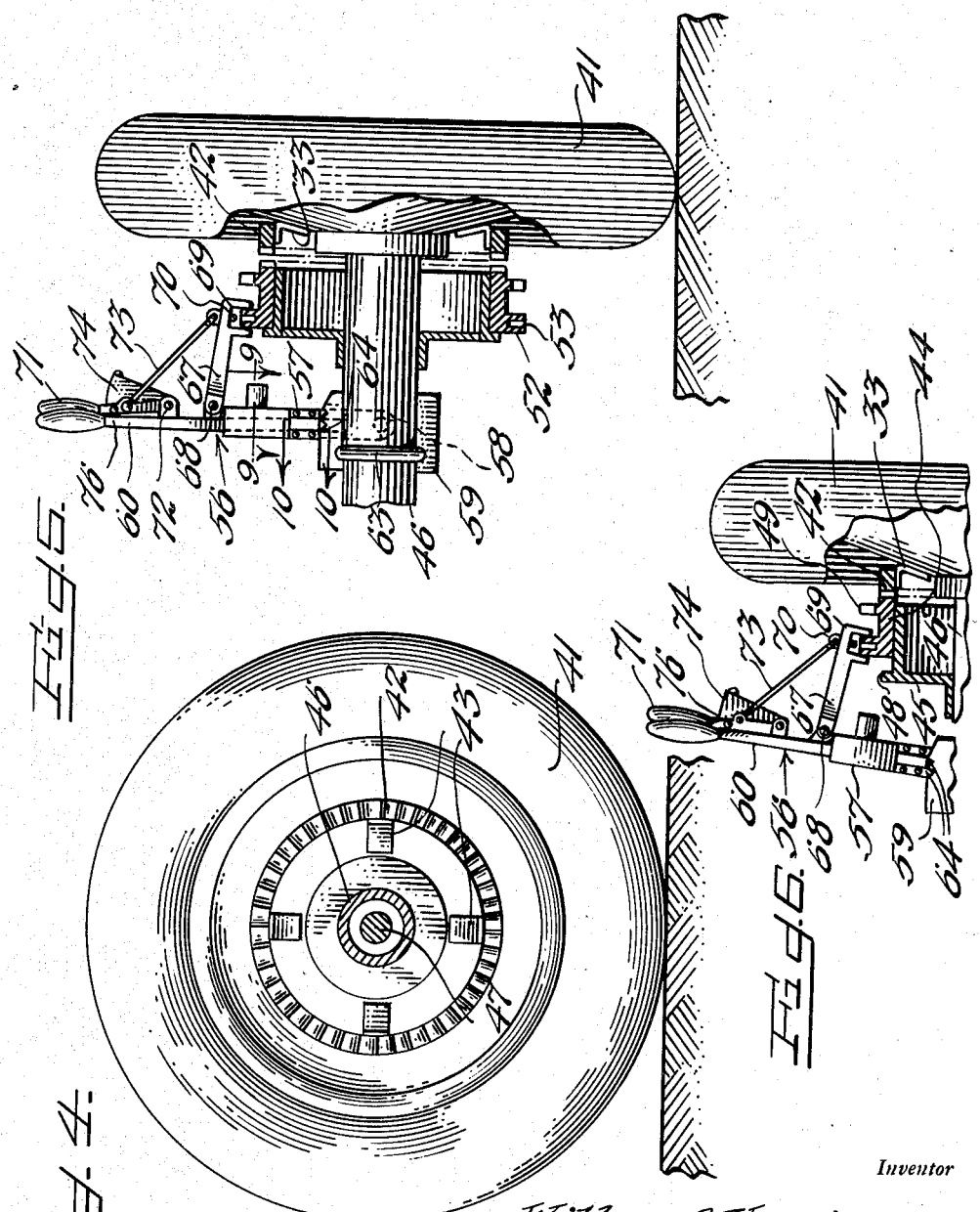

Patented May 1, 1951

2,551,120

UNITED STATES PATENT OFFICE 2,551,120

CAM OPERATED OSCILLATORY CULTIVATOR

Wilber A. Harrison, Detroit, Mich.

Application August 20, 1946, Serial No. 691,822

1 Claim. (Cl. 97—45)

My invention relates to improvements in cam operated oscillatory cultivators, the primary object in view being to provide a tractor drawn cultivator equipped to cultivate check row planted corn between the hills of the rows in a manner such that cross-cultivation is obviated, thus saving much time and labor.

More specifically my invention is directed toward providing an attachment mechanism for tractor drawn corn cultivators adapted for power operation to plow around check row planted hills of corn and in between the hills of the rows in the line of the rows.

Another object is to provide in a tractor drawn corn cultivator means for accomplishing the above of simple form and inexpensive construction which will not readily get out of order or require frequent servicing.

Other and subordinate objects, also, comprehended by my invention, together with the precise nature of my improvements, and the manifold advantages thereof, will be readily understood when the succeeding description and claim are read with reference to the drawings accompanying and forming a part of this specification.

In said drawings:

Figure 1 is a view in plan illustrating my improved corn cultivator in the preferred embodiment thereof, Figure 2 is a view in side elevation with parts in sections and in dotted lines, Figure 3 is a view in transverse section taken on the line 3—3 of Figure 2, Figure 4 is a view in transverse section taken on the line 4—4 of Figure 1, Figure 5 is a view in section taken on the line 5—5 of Figure 1 showing the clutch disengaged, Figure 6 is a similar view showing the clutch engaged, Figure 7 is a view in transverse section taken on the line 7—7 of Figure 3 and drawn to a larger scale, Figure 8 is a similar view taken on the line 8—8 of Figure 3, Figure 9 is a detail view in horizontal section taken on the line 9—9 of Figure 5, and drawn to a larger scale, Figure 10 is a view in vertical section taken on the line 10—10 of Figure 5 and drawn to a larger scale.

Reference being had to the drawings by numerals, my improvements have been shown therein, by way of exemplifying a preferred practice of my invention, as forming an attachment for a well-known type of tractor drawn two row cultivator of the usual "Ford-Ferguson" type which, being well understood in the art, has been illustrated conventionally, as sufficient for the present purposes, and need merely be described generally to explain the parts shown.

In the type of corn cultivator, above designated, the corn cultivator, per se, comprises a pair of front and rear laterally spaced beams 1, 2 connected together by cross-bars 3 forming upper rearwardly extending extensions of depending shovel carrying shanks 4 provided at the lower ends thereof with the usual V type cultivator shovels 5, the arrangement being such that the cultivator shovels 5 are grouped, as shown, in three batteries of three shovels in each battery, the batteries being disposed crosswise of the line of travel to cultivate upon opposite sides of two rows of corn, not shown, and intermediate three of such rows. A V yoke 6 arises from a pair of horizontal trunnions 7 on the beam 1 and is maintained upright by diagonal braces 8 rigidly connected to said yoke and to the rear bar 2.

The described cultivator parts are vertically swingable to elevate and lower the same by means of the hydraulic power lift mechanism of the tractor 1. This hydraulic power lift mechanism comprises a pair of power lift side arms 9 pivoted at front ends thereof, as at 10 on the differential housing 11 of the tractor 1 to extend rearwardly of said tractor for vertical swinging movement. The side arms 9 are vertically swingable through the medium of a pair of crank arms 12 operatively connected to said side arms 9 by links 13 and fast on an hydraulically operative rock shaft 14 the operation of which is controlled by a hand lever 15. The hydraulic power lift mechanism further includes an automatic control comprising a rocker 16 pivoted, as at 17, on the tractor 1 and operative by a vertically swingable compression link 18 to operate a spring loaded plunger 19. The compression link 18 is designed to be operated to so move the plunger 19 by compression exerted on said link as a result of overload on the side arms 9 tending to swing the same upwardly in a manner and for reasons which will be understood. The described trunnions 7 are rotatably mounted in the rear ends of the side arms 9 and the upper end of the V yoke 6 is pivotally connected as at 20 to the rear end of the compression link 18. Thus, under overload on the side arms 9, the described cultivator parts will be elevated, so that under vertical swinging of the side arms 9, and the compression link 18, said arms and link maintain the cultivator parts against tilting forwardly or rearwardly.

For a complete disclosure of the hydraulic power lift mechanism, above described, generally, reference may be had to U. S. Patent #2,118,180 to H. G. Ferguson.

My improvements, as shown, comprise an attachment for such a tractor drawn cultivator, as that described, and which will now be set forth in detail.

In the rear of the rear bar 2, is a cultivator frame 21 for a pair of cultivator shovels 22 and which comprises a bar 23 parallel with the rear bar 2 and provided with downturned ends 24, a pair of laterally spaced angle brackets 25 depending from said bar intermediate the ends 24, and forwardly extending bars 26 rigidly connecting said ends 24 and brackets 25 to the rear bar 2.

A pair of shanks 27 carrying the shovels 22 depend from the bar 23, between the same and the bar 2 with upper right angled ends 28 pivoted, to the bar 23, as at 29, so that said shanks 27 are swingable on said bar 23 to swing the shovels 22 laterally from side to side. The shanks 27 are arranged to swing the shovels 22 into the two rows and out of said rows to one side thereof in an arcuate path.

Cam means is provided for swinging the shanks 27 and the shovels 22 comprising a peripherally grooved cylinder 30 suitably fixed on a driven horizontal shaft 31 journaled at the ends thereof in bearings 32 on the ends 24 of the bar 23. The cylinder 30 is provided with a peripheral groove 33 including a portion 34 concentric to the axis of said cylinder, and a substantially V-shaped portion 35 forming a lateral extension of the portion 34.

A horizontal shank swinging bar 36 extends across the shanks 27 in front thereof with end yokes 37 thereon straddling said shanks 27, and a roller 38 mounted thereon by a stud 39 and running in the groove 33. The shank swinging bar 36 is endwise slidable in guide lugs, as at 40, depending from the bars 26 connecting the brackets 25 to the bar 2.

A drive between the shaft 31 and one of the rear ground wheels 41 of the tractor 1 is provided comprising a side toothed clutch ring 42 fixed to said wheel 41 by brackets, as at 43, opposite a side toothed, annular, clutch band 44 rotatable, for a purpose presently seen, on a drum 45 fast on the housing 46 of the axle 47 of said wheel 41. The clutch band 44 is laterally shiftable in opposite directions on the drum 45 into and from clutching engagement with the clutch ring 42, and said drum 45 is flanged, as at 48, to establish the clutch disengaging shift position of said band 44. Sprocket teeth 49 on the clutch ring 42, and a sprocket chain 50 operatively connects said band 44 to a sprocket wheel 51 on one end of the shaft 31. A circumferential flange 52 with circumferentially spaced sockets 53 therein is provided on the clutch band 44 for a purpose to be explained. A clamping hub 54, together with bolts 55, secure the drum 45 on the axle housing 46.

An upstanding, articulated, hand lever 56 is provided for shifting the clutch band 44 and rotating the same comprising a lower section 57 pivoted, as at 58, at the lower end thereof on an upright detent plate 59 for rocking movement laterally of said band 44, and an upper section 60 pivoted, as at 61, on a longitudinal edge flange 62 on the lever section 57 for rocking movement on said section 57 about an axis at a right angle to that of the pivot 58. The flange 62 serves as an abutment against which the lever section 60 may be thrust to rock the articulated lever 56 on the pivot 58. The detent plate 59 is fixed to the axle housing 46 by a U-bolt 63. A spring pressed, snap action, detent 63 prime on the section 57 adapted to yieldingly seat in V notches 64 in the detent plate 59 provides for yieldingly retaining said lever 56 in different laterally swung positions. A spring pressed, snap action, detent 65 in the flange 62 of the lever section 57 adapted to yieldingly seat in a socket 66 in the lever section 60 provides for yieldingly retaining said lever section 60 in a normal position in the angle formed by the flange 62 of the lever section 60.

A vertically swingable yoke arm 67 extends endwise laterally from the lever section 60, with an inner end pivoted, as at 68, on said section, and a forked outer end 69 straddling the flange 52 and provided with a stud 70 adapted to be entered into and withdrawn from the sockets 53 by swinging of said yoke arm 67 while the forked end 69 straddles the flange 52. An upstanding hand grip lever 71 pivoted, as at 72, on the lever section 60 is operatively connected by a link 73 to said lever arm 67 to swing said arm 67 vertically. The lever section 60 is provided with an edge flange 74 in which a snap action detent 75 is provided, similar to the detent 65, and for engaging a notch 76, shown in dotted lines, in said lever 71 to maintain said lever in a normal position in which the stud 70 clears the sockets 53 in the flange 52.

In operating the described invention, the cultivator shovels 22 are first set, at the beginning of the two rows to be cultivated, into a starting position, shown in Figure 1, in which said shovels are designed to be positioned in the line of the rows adjacent to the first hills in the rows. This setting is accomplished with the cultivator shovels 5 and 22 lowered by the hydraulic lift mechanism, just clear of the ground, and with the clutch band 44 disengaged from the clutch ring 42. Disengagement of the clutch band 44 is accomplished by swinging the hand lever 56 laterally, away from the drum 45 on the pivot 58, whereby the yoke arm 67, by engagement with the flanges 52, slides the clutch band 44 laterally to disengaged positions shown in Figures 1 and 5. With the clutch band 44 disengaged, the hand grip lever 71 is manipulated from normal position, shown in Figure 5, to lower said yoke arm to enter the stud 70 in one of the sockets 53 of the flange 52, so that said yoke arm 67 inter-locked with said flange. Now, by swinging the lever section 60, rearwardly, from normal position, on the stud and relative to the lever section 57, the yoke arm 67 will be moved to rotate the clutch band 44 a step of movement limited in extent by the degree of movement imparted to said lever section 60. Such rotation of the clutch band 44 will, through the described sprocket and chain connection between the same and the shaft 31, impart a step of rotation to the cylinder 30. The cylinder 30 may thus be rotated, step by step, until the roller 38 is in the center of the concentric portion 34 of the groove 33. In this position of the roller 38, the shank swinging bar 36 will be slid endwise into the starting position shown in Figure 1 with the shovels 22 adapted to line with the rows to be cultivated when the tractor 1 is driven forwardly for cultivation of the rows. Next, the clutch band 44 is engaged with the clutch ring 42, by operation of the hand lever 56, in a manner which will now be clear. The hydraulic lift mechanism is then operated to enter the shovels 5, 22 into the ground as the tractor 1 travels forward. Upon forward travel of the tractor 1, the cylinder 30 will be rotated, in a manner which will now be clear, and the cam groove 34 will, as the roller 38 moves into the portion 35 of said groove, slide the shank swinging bar 36 to swing the shovels 22 laterally back and forth so that under travel of said tractor 1, the shovels 22 will cultivate around the hills of corn in the rows on one side of said hills, and between the hills of the rows. In this connection, the concentric portion 34 of the groove 33 will hold the shank shifting bar 36 in normal position for a short distance of travel of the shovels 22 between the hills, as will be clear. In Figure 1, the manner in which the shovels 22 are swung to cultivate around the hills is shown in dotted lines.

By cultivating in the manner described, with the shovels 22, cross-cultivation of check row planted corn is not required, and substantially half of the labor and time consumed in cultivating a field of corn is saved, with the incidental wear on the machinery involved.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

What I claim as my invention is:

In a tractor-drawn cultivator, a frame, cultivator shovels having shanks pivoted on said frame for swinging said shovels laterally of the path of travel of the tractor into and from starting position, means to swing said shanks including a rotary cam on said frame, a drive train between one ground wheel of the tractor and said cam comprising a rotary clutch member on the tractor laterally shiftable into and out of driven engagement with said wheel, operating connections between said clutch member and cam, and means to shift said clutch member out of driven engagement and to subsequently rotate the same step by step to similarly operate said cam and swing said shanks to set the shovels into starting position, said last-named means comprising a circumferential flange on said clutch member having circumferentially spaced apertures therein, a lever pivoted on said tractor and having articulated sections swingable as a unit laterally of said clutch member with one section swingable independently circumferentially of said clutch member, a pivoted yoke on said independently swingable section and straddling said flange whereby lateral unitary swinging of said sections will shift said member, a stud on said yoke engageable with said apertures selectively by pivoting of said yoke relative to said independently swingable section whereby said member is adapted to be rotated step by step upon independent swinging of said independently swingable section, and a lever on said independently swingable section operatively connected to said yoke for pivoting said yoke independently of said independently swingable section.

WILBER A. HARRISON.

REFERENCES CITED

The following references are of record in the file of this patent:

UNITED STATES PATENTS

| Number | Name | Date |
|---|---|---|
| 306,623 | Johnson | Oct. 14, 1884 |
| 997,426 | Taylor | July 11, 1911 |
| 1,149,126 | Gerhard | Aug. 3, 1915 |
| 1,331,148 | Gwin | Feb. 17, 1920 |
| 1,418,159 | Odell | May 30, 1922 |
| 1,895,665 | Johnson | Jan. 31, 1933 |